United States Patent [19]

Domer

[11] 4,348,015

[45] Sep. 7, 1982

[54] SHOCK ABSORBERS

[75] Inventor: Michel Domer, Montigny les Cormeilles, France

[73] Assignee: Hutchinson-Mapa, Paris, France

[21] Appl. No.: 147,346

[22] Filed: May 7, 1980

[30] Foreign Application Priority Data

May 11, 1979 [FR] France .................. 79 12115

[51] Int. Cl.³ ............................. F16F 3/08
[52] U.S. Cl. .................. 267/140.4; 267/153
[58] Field of Search ............ 267/139, 140, 140.1, 267/140.3, 141, 141.1, 141.2, 141.3, 141.4, 141.5, 151–153, 63 R

[56] References Cited

U.S. PATENT DOCUMENTS 2,987,291  6/1961  Dyson .................. 267/153 X

FOREIGN PATENT DOCUMENTS 52-41775  3/1977  Japan .................. 267/140
9257 of 1915  United Kingdom .

Primary Examiner—Duane A. Reger
Attorney, Agent, or Firm—Larson & Taylor

[57] ABSTRACT

The shock absorber comprises two stacks, of alternated metallic plates and elastic blocks mutually encircling one another. The blocks of each stack are borne by the plates of the other and are constituted of an elastomer different from that constituting the blocks of the other stack.

10 Claims, 3 Drawing Figures

FIG.1.
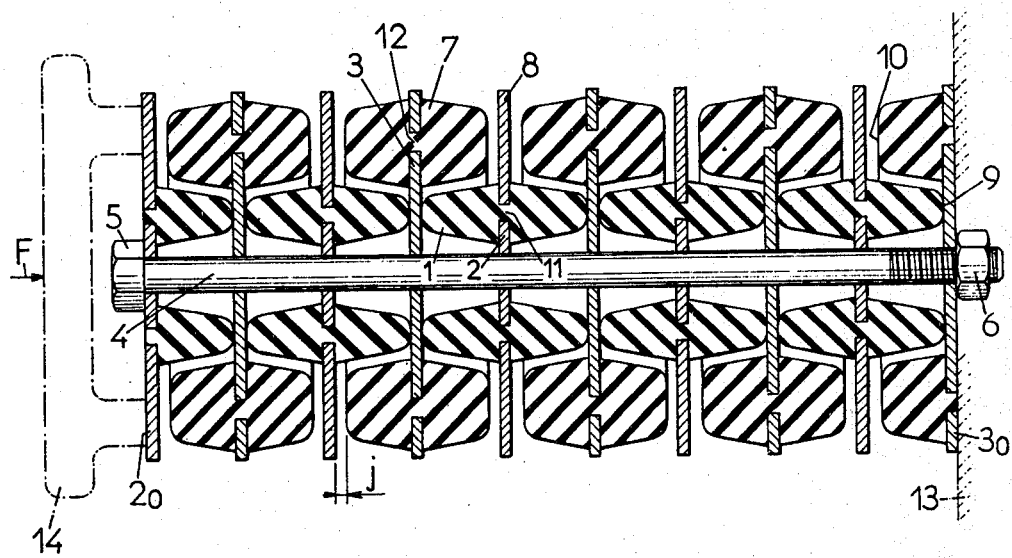
FIG.2.
FIG.3.
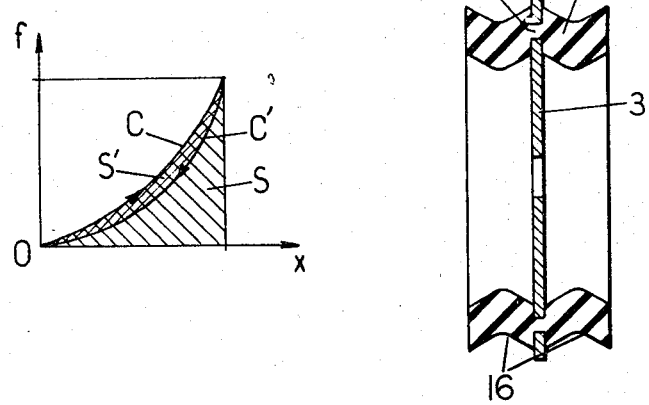

SHOCK ABSORBERS

BACKGROUND AND SUMMARY OF THE INVENTION

The present invention relates to shock absorbers such as, for example, railroad pads mounted on fixed buffers or on trucks, cars or railroad engines, pads arranged vertically at the bottom of elevator shafts, or again certain harbor stops.

It relates particularly, among such shock absorbers to those including two mutually encircling stacks, of alternated metallic elements and elastic elements, adapted for one to bear against the other, with compression of the elastic elements, when shocks are received.

It is an object of the invention to confer on such shock absorbers good qualities of responsiveness and of flexibility for the damping of weak impacts and a high capacity for the storage of energy for the damping of severe impacts.

It is another object of the invention to render the manufacture and assembly of such dampers particularly simple.

According to the invention therefore there are provided shock absorbers of the kind concerned characterised essentially in that the elastic elements of each stack are held by metal elements of the other stack and in that the elastic elements of the two stacks are constituted respectively of elastomers having different characteristics of deformation and of damping.

In preferred embodiments, recourse is had to one and/or the other of the following features:

The elastic elements of one of the stacks have a damping ratio less than 10% and those of the other stack, a damping ratio higher than 10%, The stack comprising the elastic elements with the higher damping ratio is outside the other stack, A slight axial pre-stress is exerted on the elastic elements with the lower damping ratio, The surfaces, of the elastic elements with the lower damping ratio, coming into contact with the metal elements inserted between them for the resting state of the shock absorber are narrow and convex, Certain of the elastic elements are designed to work on buckling when they are compressed axially.

The invention comprises, apart from these main features, certain other features which are preferably used at the same time and which will be more explicitly considered below.

In the following, a preferred embodiment of the invention will be described with reference to the accompanying drawing given of course purely by way of non-limiting example.

SHORT DESCRIPTION OF THE DRAWINGS

FIG. 1, of this drawing, shows an axial section of a railroad shock absorbing buffer constructed according to the invention.

FIG. 2, is an explanatory graph.

FIG. 3, shows, also in axial section, a possible modification according to the invention, for certain of the constituent rings of said buffer.

DESCRIPTION OF PARTICULAR EMBODIMENT

The buffer concerned comprises a first stack of rings 1 mounted on metal discs 2 parallel and juxtaposed axially against one another with the interposition of metal washers 3, the discs and washers being mounted to slide on a central rod 4.

This rod has at one of its ends a head 5 and its other end is threaded and receives a nut 6 the screwing of which has the effect of ensuring the axial juxtaposition of the different elements 1 and 3 constituting the stack, if necessary with a slight pre-stressing.

Said buffer is made to include also a second stack of rings 7 encircling the first and mounted on the peripheral zones of the washers 3.

Each of the discs 2 is itself extended radially outside of the ring 1 which it bears by a peripheral ring 8 interposed axially between two successive rings 7.

The rings 1 of the first stack are constituted of an elastically very deformable elastomeric material and having a weak damping ratio T in the sense defined below, this ratio T being preferably less than 10%: such a material is, for example, natural rubber.

By damping ratio T of an elastic material, is meant here the ratio between, on the one hand, the energy absorbed by a block of this material when the latter is successively compressed to the vicinity of its maximum crushing, and then released so as to resume its initial shape, and on the other hand the energy stored in said block in the course of this compression-relaxation cycle.

This ratio T can be deduced from the hysteresis curve representing the deformation concerned.

Such a curve can be seen in FIG. 2, in which the abscissae denote the deformations x and the ordinates, the forces f to which these deformations correspond: the segment C corresponds to the compression of the block of elastomeric material concerned and the segment C', to its subsequent expansion.

If S is the total surface comprised between the segment C and the axis of the abscissae, and S' the surface, here in the form of a crescent, comprised between the two segments C and C', the above damping ratio T is equal to the ratio between the surfaces S' and S.

The contact areas 9 between the rings 1 and the washers 3 juxtaposed axially against them are narrow and convex so that the absorption of impacts by the damper concerned starts by deforming these zones progressively thereby widening them.

This type of progressive elastic deformation confers on the damper a great flexibility and an excellent responsiveness for weak impacts.

The rings 7 of the second stack are constituted of a less deformable material than the preceding one, but having a higher damping ratio T, preferably higher than 10%, which enables it to store high energies on the absorption of severe impacts: such a material is, for example, butyl rubber.

In the embodiment illustrated, an axial gap j exists in the resting state of the damper between each ring 7 and each of the facing rings 8.

Consequently, these rings 7 do not work for weak impacts: they come into action only when the axial crushing of the rings 1 has been sufficient to cancel out the whole of the plays j; but from this moment, all the rings 7 immediately come into action in their turn.

The annular acting surfaces 10 of these rings, that is to say adapted to come into contact with the immediate rings 8 as soon as the play j has been eliminated, are advantageously flat, as illustrated, so that the whole mass of these rings is urged to work in axial compression from the start of their solicitation.

The assembly of the various rings 1 and 7 on their respective holder discs 2 and 3 is advantageously carried out by forming these rings directly by molding and vulcanisation on these discs.

This forming is ensured so that said rings extend axially on both sides of their holder discs, the connection between the two portions of rings formed respectively on the two surfaces of a same disc being ensured through holes 11, 12 distributed circularly on each disc.

In the preferred embodiment illustrated, the middle plane of the holder disc of each ring constitutes a plane of symmetry for this ring and the holes 11, 12 enabling the two halves of said ring to be coupled into a single unit are arranged at the middle of the radial thickness of the latter at the level of the disc.

In addition, the radial thickness of each ring decreases progressively with the distance from its holder disc.

The metal elements denoted above respectively by the references 2, 8 ("discs extended externally by rings") and 3 ("washers") are preferably constituted by identical plates, but pierced by holes closer to the axis in the first case (holes 11) than in the second (holes 12).

Finally, the damper may be considered as composed of an alternated stacking of pads of two types, namely identical discs lined alternately:

The first 2, with a relatively deformable ring 1, having a small average diameter, a relatively small radial dimension and relatively large axial dimension, And the second 3, with a ring 7 with heavy damping, having an average diameter higher than the preceding one, a greater radial dimension than the preceding one and a smaller axial dimension than the preceding one.

The fact that the two types of elastomers concerned relate exclusively to one of the two types of pads enables very simple manufacture of the damper by means of two different molds: these two molds enable, in fact, the elastomeric rings 1, 7 to be molded, in two different types (through thier shapes and their properties) on identical discs, but differently perforated, and bringing into action molding methods which can apply different temperatures, pressures.

The assembly of the damper is then very easy to achieve by the alternate stacking of the pads of two types thus obtained separately.

At the end of the stack, advantageously discs are provided on which only half-rings are made to project axially, in the direction of the other rings of the structure, these half-rings being formed from any one of these two above-described types: so the construction is terminated axially by two rigid discs.

One of these end discs, denoted by the reference $3_O$, at the right end of the damper illustrated in FIG. 1, can be shouldered against a frame 13 adapted to absorb the shock to be dampened whereas the disc $2_O$ disposed at the axial end opposite the said structure is covered by a hollow that 14 intended to receive said shock, the head 5 of the rod 4 being assumed coupled to the disc $2_O$ whereas the threaded end of the rod provided with the nut 6 can be moved freely inside the frame 13.

The operation of a damper of the above-described type is as follows:

The application of a shock, shown diagrammatically by the arrow F, on the cap 14, is manifested:

first for a flexible, elastic and relatively "responsive" deformation of the annular tops of rings 1 until elimination of the plays j, then by gradual axial crushing of the rings 7 supplementing the continuing deformation of the rings 1, if the shock concerned is sufficiently severe.

After the taking of this shock by the whole of the damper, the elastic relaxation of the different rings brings back the assembly into its initial position by restoring the stored energy in reversed direction to the moving body which has caused the impact.

As a result of which, and whatever the embodiment adopted, there is finally provided a damper whose constitution, operation and advantages (in particular excellent responsiveness for the damping of weak impacts, high energy absorbing capacity for more severe shocks, simplicity of manufacture an of assembly) are sufficiently apparent from the foregoing.

As is itself evident and as emerges already from the foregoing, the invention is in no way limited to its types of application and embodiments which have been more especially evisaged; it encompasses, on the contrary, all modifications and notably:

those wherein the rings 1 of the central stack are replaced by elastic units without central openings, the various discs 2 and 3 also then possibly not being open at the centers, those where the contours of the elastic and metallic elements are other than circular, for example rectangular, those where the mutual guidance of the various superposed pads is assured by means other than the central rod, for example, by means of an outer rigid sleeve, itself possibly reduced to some parallel bars, Those where certain of the above rings 1 and 7 have a shape different from that described with regard to FIG. 1, this shape can, for example, be axially disymmetric with respect to the corresponding holding metal element or even assume that of a tubular section adapted to work by buckling as has been illustrated at 15 in FIG. 3, having annular indentations 16, the elastic ring of this Figure having been assumed to be mounted on the periphery of a disc 3 pierced with holes 12 of the previously described type, those where one at least of the annular frontal surfaces 10, or the rings 7, adapted to come into contact with the facing rings 8 are not flat, but slightly corrugated peripherally so that the start of compression of this ring is rendered more gradual and so that the curve representing the deflexion of the damper as a function of the axial force applied against it is thus rendered more continuous, those where the number of stacks of concentric elastic elements with different damping ratios is greater than two.

I claim:

1. Shock absorber comprising two concentric adjacent stacks, each stack having a plurality of metallic elements and elastic elements arranged with the metallic elements and elastic elements alternating with each other in each stack, the metallic elements and elastic elements arranged to bear one against the other upon compression of the shock absorber, said elastic elements of each stack being borne by the metallic elements of the other stack and wherein the elastic elements of the two stacks are constituted respectively of elastomers having different deformation and damping characteristics.

2. Shock absorber according to claim 1, wherein the elastic elements of one of the stacks have a damping ratio less than 10% and those of the other stacks, a damping ratio greater than 10%.

3. Shock absorber according to claim 1, wherein the stack comprising elastic elements with the highest damping ratio is outside the other stack.

4. Shock absorber according to claim 2, wherein the stack comprising elastic elements with the highest damping ratio is outside the other stack.

5. Shock absorber according to claim 1, wherein a slight axial pre-stress is exerted on the elastic elements with the lowest damping ratio.

6. Shock absorber according to claim 2, wherein a slight axial pre-stress is exerted on the elastic elements with the lowest damping ratio.

7. Shock absorber according to claim 1, wherein the surfaces of the elastic elements with the highest damping ratio coming into contact with the metallic elements interposed between them for the relaxed state of the damper, are narrow and convex.

8. Shock absorber according to claim 2, wherein the elastic elements with the highest damping ratio coming into contact with the metal elements interposed between them for the relaxed state of the shock absorber, are narrow and convex.

9. Shock absorber according to claim 1, wherein certain elastic elements include an indentation between its outer end and the metallic element on which it is borne, on both sides of said metallic element, so as to operate by buckling when they are compressed axially.

10. Shock absorber according to claim 2, wherein certain elastic elements include an indentation between its outer end and the metallic element on which it is borne, on both sides of said metallic element, so as to operate by buckling when they are compressed axially.

* * * * *